US009257040B2

(12) United States Patent
Kotzin

(10) Patent No.: US 9,257,040 B2
(45) Date of Patent: Feb. 9, 2016

(54) METHOD AND DEVICE FOR LEARNING AND PLAYING BACK ELECTROMAGNETIC SIGNALS

(75) Inventor: Jason Kotzin, Santa Clara, CA (US)

(73) Assignee: Flirc, Inc., Santa Clara, CA (US)

( * ) Notice: Subject to any disclaimer, the term of this patent is extended or adjusted under 35 U.S.C. 154(b) by 985 days.

(21) Appl. No.: 13/174,770

(22) Filed: Jun. 30, 2011

(65) Prior Publication Data

US 2013/0004178 A1 Jan. 3, 2013

(51) Int. Cl.

| | |
|---|---|
| ***G08C 19/28*** | (2006.01) |
| ***G08C 23/04*** | (2006.01) |
| ***G06F 13/38*** | (2006.01) |
| ***H04N 5/76*** | (2006.01) |

(52) U.S. Cl.

CPC .................................... *G08C 23/04* (2013.01)

(58) Field of Classification Search

CPC .... G08C 2201/20; G08C 19/28; G08C 23/04; G08C 2201/40; G08C 25/04; H04N 7/163; H04N 5/765; G06F 13/385; G06F 2213/3814; H04M 1/7253

USPC ................ 340/870.01; 600/300; 702/160, 19

See application file for complete search history.

(56) References Cited

U.S. PATENT DOCUMENTS

| | | | | |
|---|---|---|---|---|
| 4,626,848 | A | 12/1986 | Ehlers | |
| 5,650,774 | A * | 7/1997 | Drori | 340/5.22 |
| 6,736,759 | B1 * | 5/2004 | Stubbs et al. | 482/8 |
| 7,005,966 | B1 * | 2/2006 | Leman et al. | 340/10.4 |
| 7,030,735 | B2 * | 4/2006 | Chen | 340/323 R |
| 7,063,665 | B2 * | 6/2006 | Hasegawa et al. | 600/300 |
| 7,548,171 | B2 * | 6/2009 | Koutsoukos et al. | 340/870.01 |
| 8,618,917 | B2 * | 12/2013 | Innes et al. | 340/12.23 |
| 2005/0044414 | A1 * | 2/2005 | Sawada et al. | 713/201 |
| 2007/0234383 | A1 * | 10/2007 | Miwa | 725/37 |
| 2010/0052870 | A1 | 3/2010 | King | |
| 2010/0123598 | A1 * | 5/2010 | Brodersen et al. | 340/825.69 |
| 2010/0123834 | A1 | 5/2010 | Brodersen | |
| 2010/0283624 | A1 * | 11/2010 | Krueger | 340/825 |
| 2012/0075082 | A1 * | 3/2012 | Rothkopf et al. | 340/12.28 |
| 2013/0171981 | A1 * | 7/2013 | Woo | 455/420 |

OTHER PUBLICATIONS

Ken Shirriff', "Using arbitrary remotes with the Arduino IRemote library", blog, Jan. 28, 2010, http://www.arcfn.com/2010/01/using-arbitrary-remotes-with-arduino.html.*

Ian et al., "How-to USB remote control receiver", post and comments from commentators, Hack A Day, Oct. 30, 2008, http://hackaday.com/2008/10/30/how-to-usb-remote-control-receiver/.*

* cited by examiner

*Primary Examiner* — Nam V Nguyen

(74) *Attorney, Agent, or Firm* — Aleksandr Korzh

(57) ABSTRACT

Methods and device for learning electromagnetic signals, saving the signals, and pairing the signals with commands interpreted by a processor. The methods comprise the steps of detecting an electromagnetic signal transmitted from an external device; converting the detected electromagnetic signal into a numerical representation; placing the numerical representation into an array; associating the array with a reference or transforming the array with an algorithm and adding the reference or transformation into a memory table; and associating the reference or transformation with a computer command or combination of computer commands and adding the associated computer command or combination of commands into the memory table.

19 Claims, 12 Drawing Sheets

Figure 11

Example Algorithm - DJB2

```
unsigned long hash(unsigned char *str)
{
        unsigned long hash = 5381;
        int c;

        while (c = *str++)
            hash = ((hash << 5) + hash) + c; /* hash * 33 + c */

        return hash;
}
```

METHOD AND DEVICE FOR LEARNING AND PLAYING BACK ELECTROMAGNETIC SIGNALS

BACKGROUND

Field

An embodiment of the invention relates to a device for reading, storing, and playing back an infrared signal. Other embodiments are also described.

Presently, learning remote controls are available in various forms. These remote controls are able to learn infrared signals either using a preset code or reading in an infrared signal and saving it in internal memory. Although these remotes offer one solution for combining several remote controls into one, there is no good solution currently for using a standard remote control with a computer system. There are various solutions available for connecting third party remote controls to a computer that provide for control over computer functions.

One available solution exists by connecting a third party remote control with a proprietary infrared receiving unit to a computer. Although this remote control provides for programming and configuration for use with a computer, it requires a proprietary remote control and receiver unit. A solution for using any standard infrared remote control and configuring it for use with a computer is not possible with such a system. Such a solution is desirable with the continued use of computer systems connected to a television screen for use as a "media center" computer. A solution for simple and reliable configuration of existing television or other infrared remote controls to control computer functions is needed.

SUMMARY OF INVENTION

An embodiment of the invention is directed to a USB (universal serial bus) device that is able to read in an infrared signal, store the signal and interact with software on a computer to play back the recorded signal as a preset computer function. The device can read in a signal, convert the signal to a hash code and store the hash code in memory. This stored signal code can then be triggered when detected by the USB device and send a designated signal to the computer.

In one embodiment of the invention, a learning method captures infrared timer values based on the signal edge. The values are assembled in an array of values and then a unique hash code is assembled from the values. The hash code is then associated with a command and added to a lookup table.

In one embodiment of the invention, a learning method captures infrared timer values based on the signal edge. The values are configured in an array called a packet. The packet is then associated with a command and added to a lookup table.

In one embodiment of the invention, a software program is used for recording an infrared signal. The software determines whether a new edge is detected and captures and appends each new value to an array. Once the software determines the array is complete, it creates a hash and stores it in memory.

In one embodiment of the invention, playback of a recorded signal is accomplished by reading in an infrared signal, and storing an associated hash code locally. The infrared signal edges are captured and assembled into an array. A hash code is then created from the values. The hash code is then found in a lookup table and the associated command is sent to the host.

In one embodiment of the invention, playback of a recorded signal is accomplished by reading in an infrared signal and sending an associated packet to the host. The infrared signal edges are captured and assembled into an array called a packet. The packet is then found in a lookup table and the associated command is sent to the host.

In one embodiment of the invention, a software program is used for playing back a command associated with an infrared signal. The software determines whether a new edge is detected and captures and appends each new value to an array. The software then creates a hash code and searches a lookup table for the hash code and associated command. The command is then sent to a host.

The above summary does not include an exhaustive list of all aspects of embodiments of the present invention. It is contemplated that embodiments of the invention include all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Reference will be made to embodiments of the invention, examples of which may be illustrated in the accompanying figures. These figures are intended to be illustrative, not limiting.

FIG. 11 depicts code implementing the algorithm for storing the information obtained from the processes in the figures above.

DETAILED DESCRIPTION OF THE INVENTION

Figure 1:
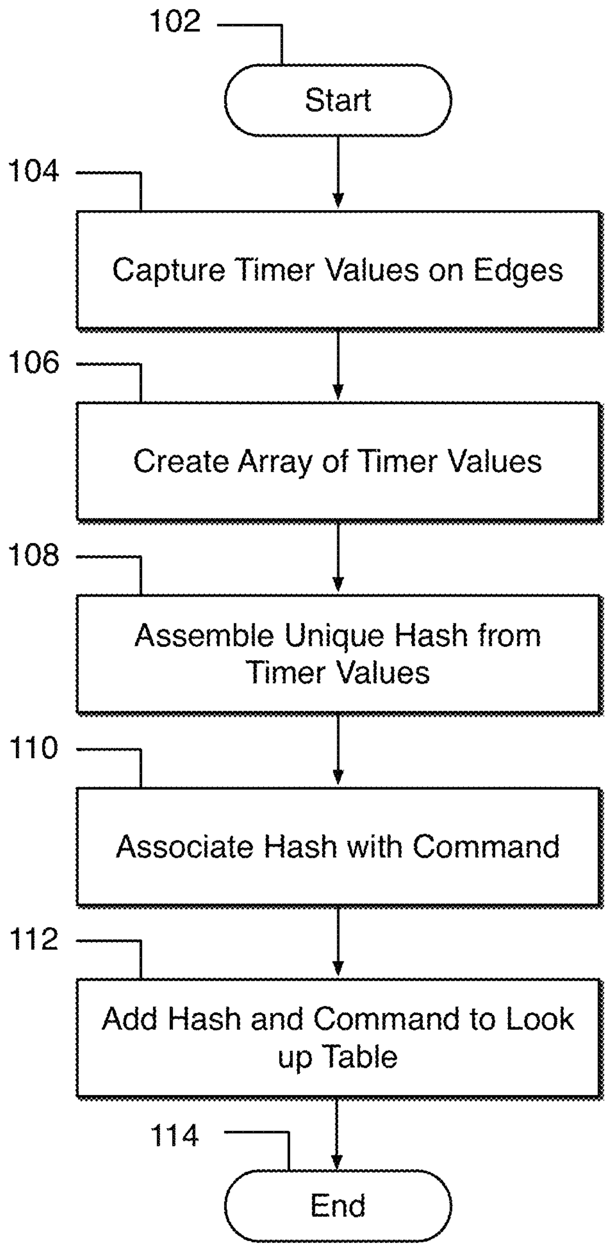
FIG. 1 depicts one set of steps for learning an infrared signal.

FIG. 1 is one learning option for reading and capturing a particular infrared signal sent by an external device. The sequence start 102 occurs when the infrared signal is first detected on the first logical edge transition of the signal. The infrared timer values are captured 104 by detecting the edges of the infrared signal. An array of timer values is assembled 106 with the detected values. A unique hash code is assembled from the timer values 108 in the array using an algorithm such as the one described below. The hash code is then associated with a designated computer command 110 such as the up, down, left and right keys or any other computer command or combination of commands. The hash code and associated command or combination of commands is then added to a lookup table 112 with one embodiment of the lookup table shown in FIG. 8. Once the hash code and associated command or combination of commands is added to the lookup table, the sequence ends 114. This process may be repeated until all desired commands or combinations of commands are associated with hash codes and stored in the lookup table.

Figure 2:
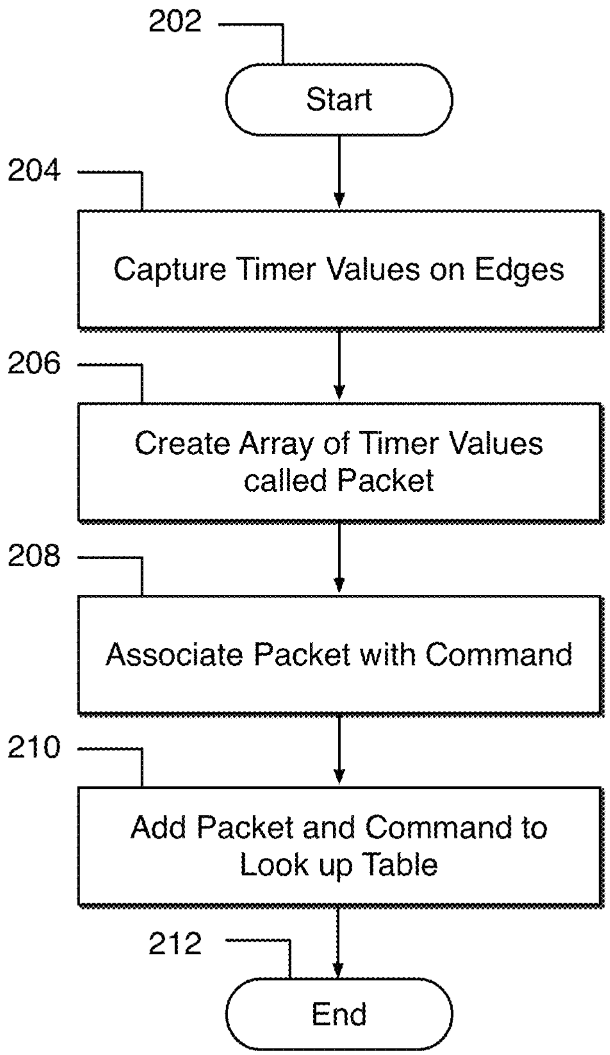
FIG. 2 depicts an alternative set of steps for learning an infrared signal.

FIG. 2 depicts an alternative learning option for reading and capturing a particular infrared signal sent by an external device. The sequence start 202 occurs when the infrared signal is first detected. The infrared timer values are captured 204 by detecting the edges of the infrared signal. An array of timer values is assembled 206 with the detected values and is called a packet. A computer command or combination of commands is associated with the packet 208. The packet and associated command or combination of commands 210 is then added to a lookup table. Once the packet and associated command or combination of commands is added to the lookup table, the sequence ends 212.

Figure 3:
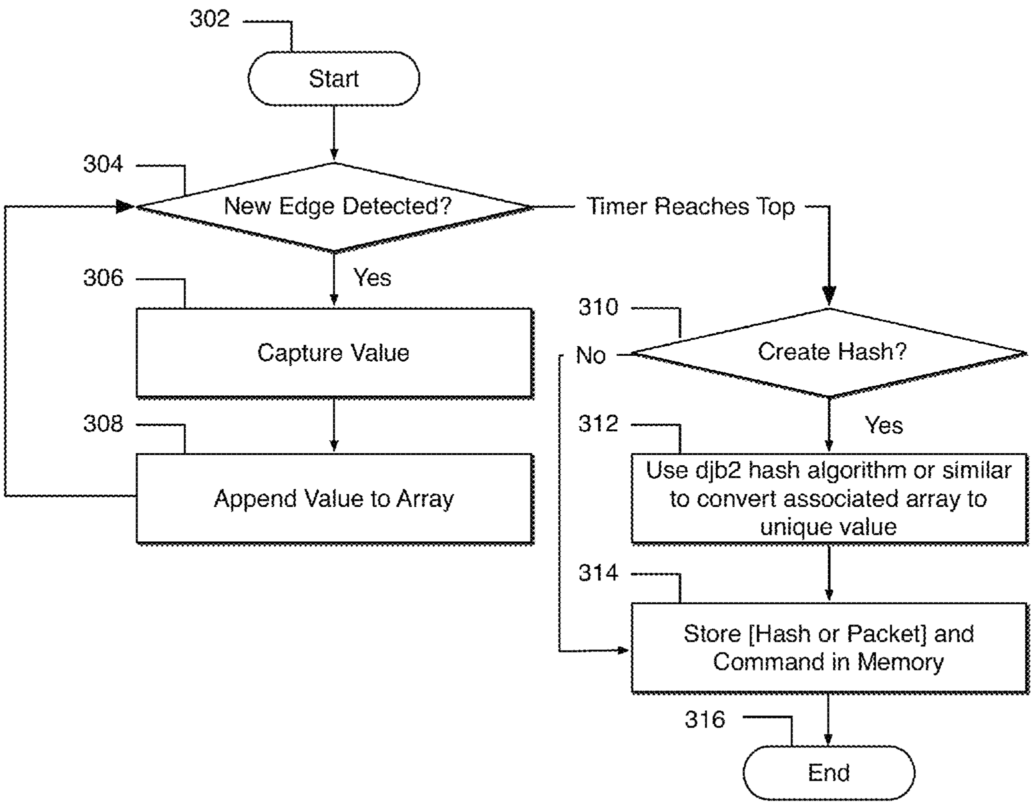
FIG. 3 depicts a software diagram with several steps and decisions for recording an infrared signal.

FIG. 3 is a software flowchart diagram implementing the recording of an infrared signal. The process for reading and capturing a particular infrared signal may also be implemented through firmware or hardware as is known by someone of ordinary skill in the art. The start 302 of the software sequence occurs when the first edge is detected. This event triggers a timer with a top set at a constant static value. If a new edge is detected 304 prior to the time reaching the top, the value is captured 306. The value is then appended to an array 308 of values.

If no more values are detected and the timer reaches the top value, the program decides whether to create a hash code 310 from the values in the array. The hash code can be created 312 using djb2 or other similar algorithm. The algorithm converts the associated array of values to a unique hash code. Alternatively, if the packet method described above is used, the software will not create a hash code. The hash code or packet created from a detected signal is then associated with a computer command or combination of computer commands. The 314 hash code or packet and associated command or combination of commands is then stored in memory. The end 316 of the software sequence occurs once hash code or packet and associated command or combination of commands is stored in memory.

Figure 4:
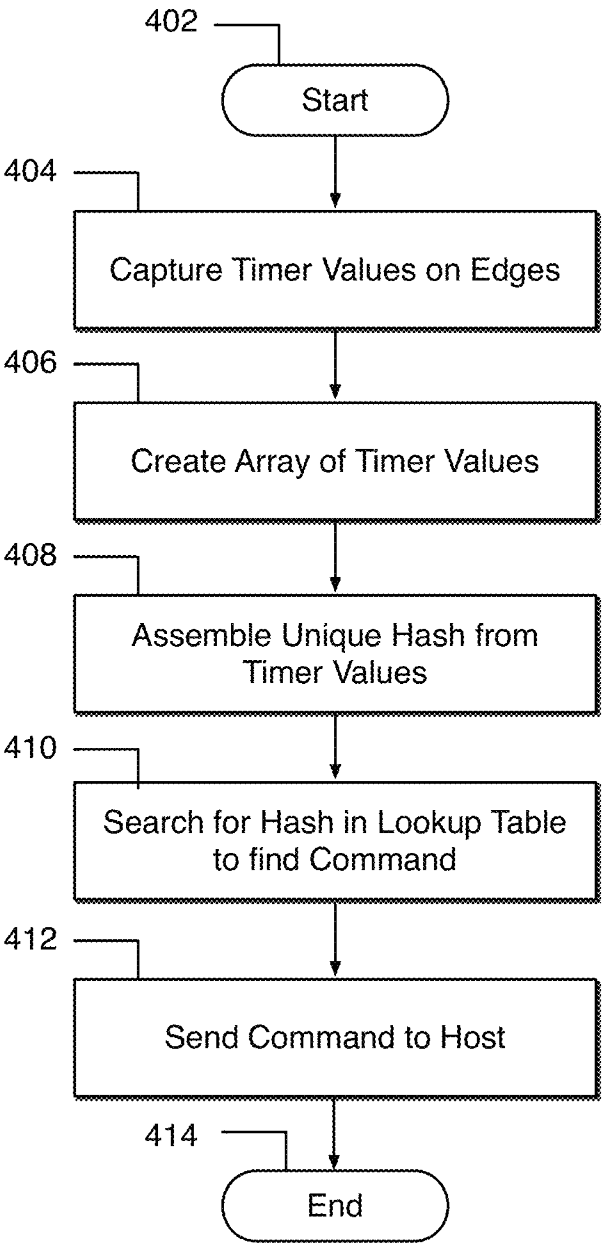
FIG. 4 depicts one set of steps for playing back a previously recorded infrared signal.

FIG. 4 is one method for playing back a signal and associated command stored in a lookup table. The start 402 of the playback sequence occurs when a previously recorded signal is detected. Detected infrared signal edges are captured 404 based on detection of each edge of the signal. The detected timer values are recorded into an array 406. A hash code is assembled 408 from the array of timer values using a hash code such as the one depicted in FIG. 8, FIG. 10, and FIG. 11.

The hash code assembled from the array of timer values is searched for 410 in the previously constructed lookup table. Once the associated hash code is found in the lookup table, the command or combination of commands associated with hash code is sent to the host 412. The playback sequences ends 414 once the command or combination of commands is sent to the host.

Figure 5:
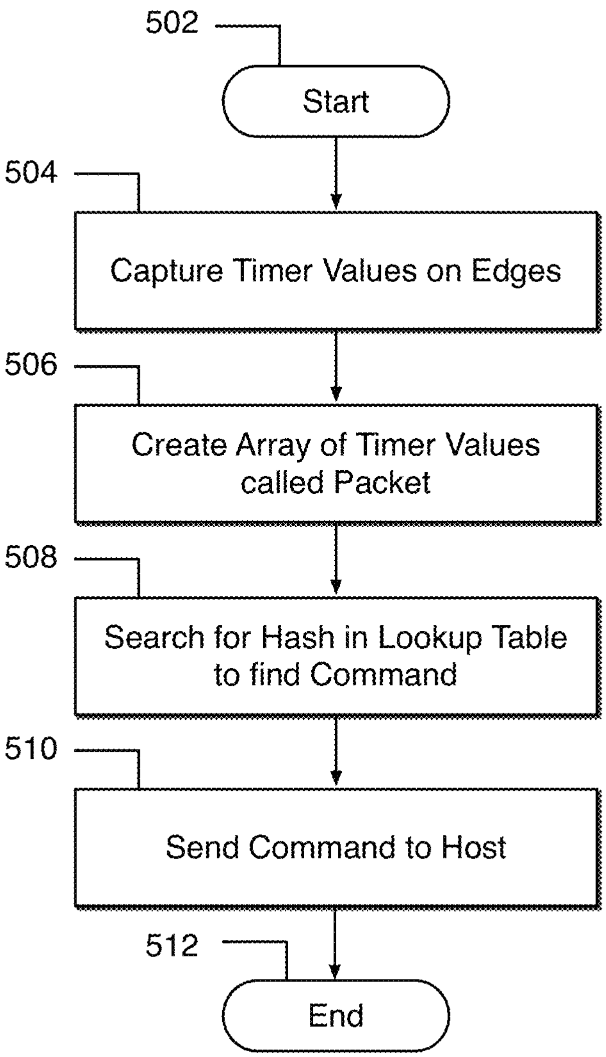
FIG. 5 depicts an alternative set of steps for playing back a previously recorded infrared signal.

FIG. 5 is an alternative method for playback of a previously recorded signal and command or combination of commands. The start 502 of the playback sequence occurs when a previously recorded signal is detected. Timer values of the infrared signal edges are captured 504. The 506 timer values are placed in an array called a packet. The packet is then searched for 508 in the lookup table to find the associated computer command or combination of commands. Once found, the command or combination of commands is sent 510 to the host. The sequence ends 512 once the command or combination of commands has been sent to the host.

Figure 6:
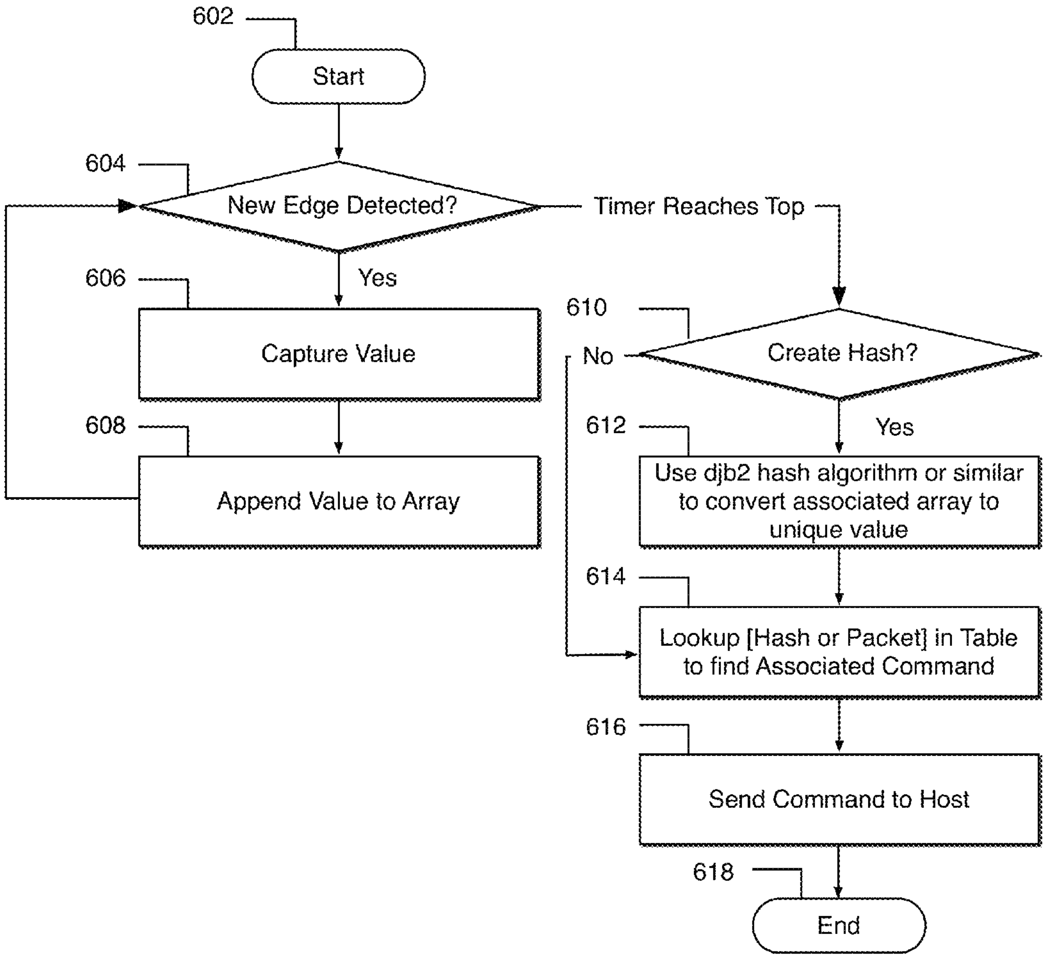
FIG. 6 depicts a software diagram with several steps and decisions for playing back a previously recorded infrared signal.

FIG. 6 is a software flowchart diagram implementing the playback of a command associated with a particular infrared signal. The software starts 602 when the first edge of an infrared signal is detected. A timer is started with a constant static top value. If a new edge is detected 604 the timer value is captured 606. The captured timer value is then appended 608 to an array. The program then restarts the timer and waits for another edge to be detected.

If the timer reaches the top value before an edge is detected, the software decides 610 whether to create a hash code from the stored values. If a hash code must be created, the 612 djb2 or other similar algorithm is used to convert the associated array to a unique hash value. Whether a hash code is created or the packet system described above is used, the hash code or packet is searched for 614 in the lookup table. Once the hash code or packet is located, the associated command or combination of commands 616 is sent to the host. The sequence ends 618 when the command or combination of commands has been sent to the host.

Figure 7:
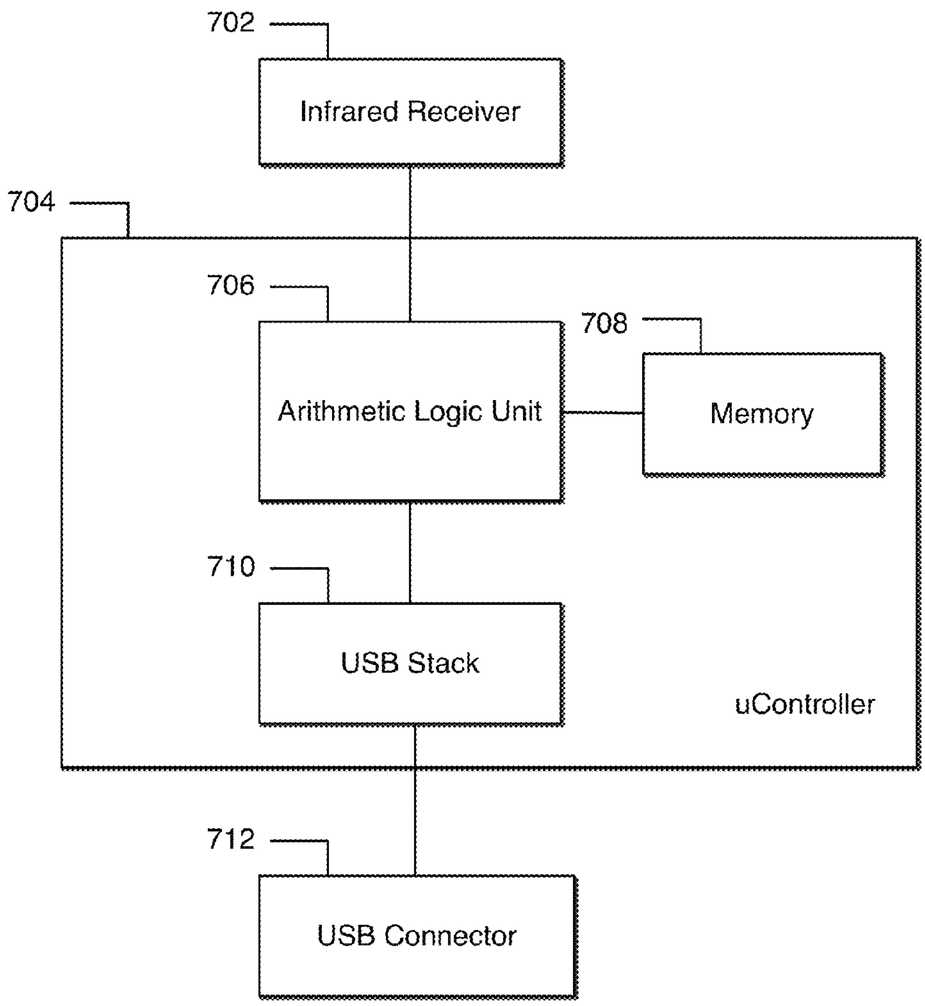
FIG. 7 depicts a block diagram of one hardware implementation of the invention.

FIG. 7 is a hardware block diagram of an implementation of the device for reading, storing and playing back an infrared signal. The device has an infrared receiver 702 that detects an infrared signal sent from an external device such as an infrared remote control. The infrared receiver 702 is coupled to a microcontroller 704 or other digital processing unit as known in the art. The microcontroller 704 is coupled to a USB (universal serial bus) connector 712 for connecting the device to a computer, handheld computer or other comparable device.

One embodiment of the microcontroller includes an ALU (arithmetic logic unit) 706, memory 708 and a USB stack 710. The ALU is coupled to the USB stack and the memory. The memory 708 or USB stack 710 may alternatively be located outside of the microcontroller.

Figure 8:
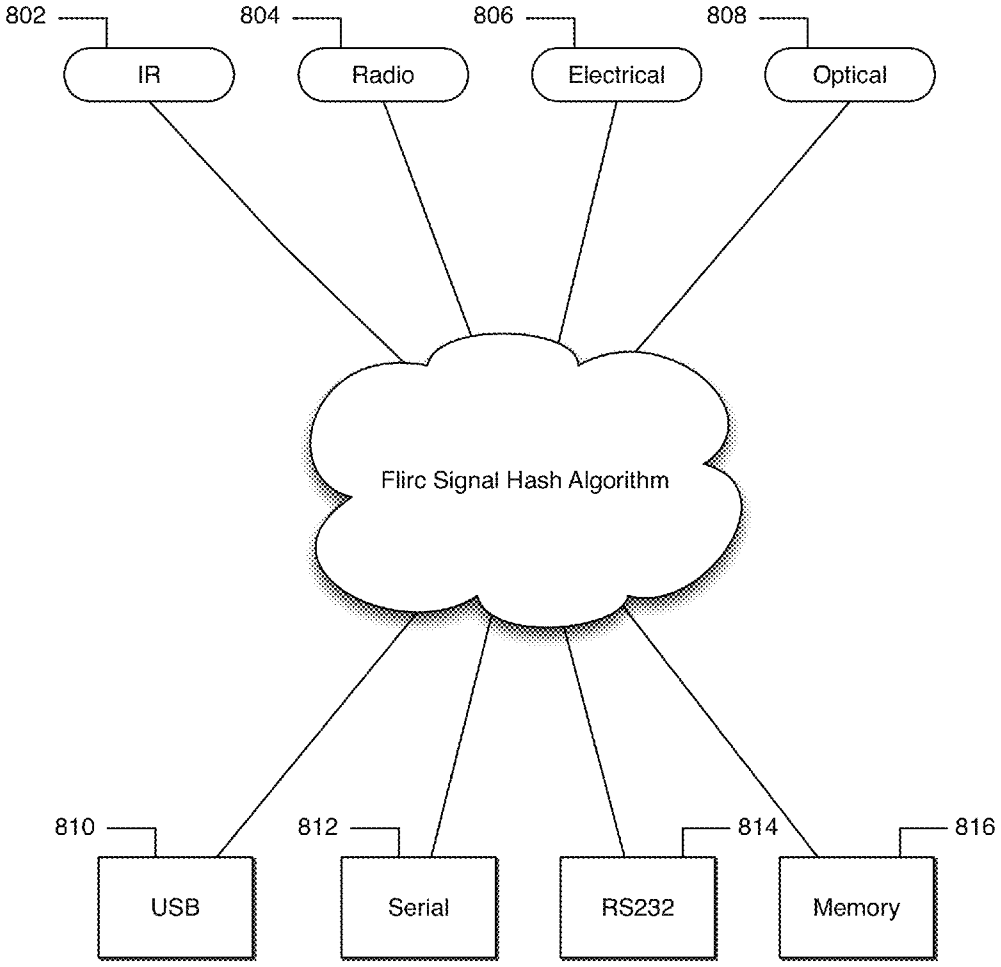
FIG. 8 depicts several alternative embodiments of the invention.

FIG. 8 shows several alternative implementations of the signal learning and playback method and device. The methods and algorithms described herein may be implemented for detecting and encoding an IR (infrared) 802 signal. Alternatively the methods and algorithms may be used for detecting and encoding radio 804 signals, electrical 806 signals or optical 808 signals.

The signals mentioned above may be detected and encoded with the methods and algorithms stated above. The playback signal, command or combination of commands may be sent to the computer, handheld computer or other similar device via a USB (universal serial bus) 810 connection. Alternatively, the signal, command or combination of commands may be sent via a serial connection 812, RS232 connection 814 or from internal or external stored memory 816.

Figure 9:
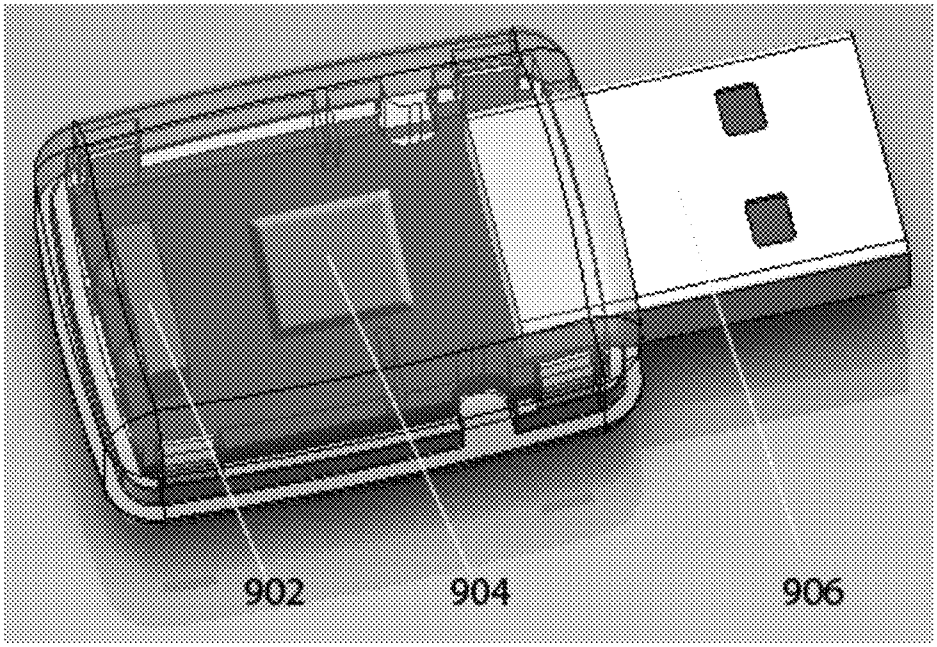
FIG. 9 depicts one mechanical implementation of the invention.

FIG. 9 is one physical implementation of a signal learning and playback device. The infrared receiver 902 is located so that an external infrared signal may be detected. The infrared receiver is coupled to a microcontroller 904. The microcontroller reads the signal detected by the infrared receiver. After processing the signal using any of the various methods described herein, the microcontroller sends the appropriate signal command through the USB port 906 to an attached device.

Figure 10:
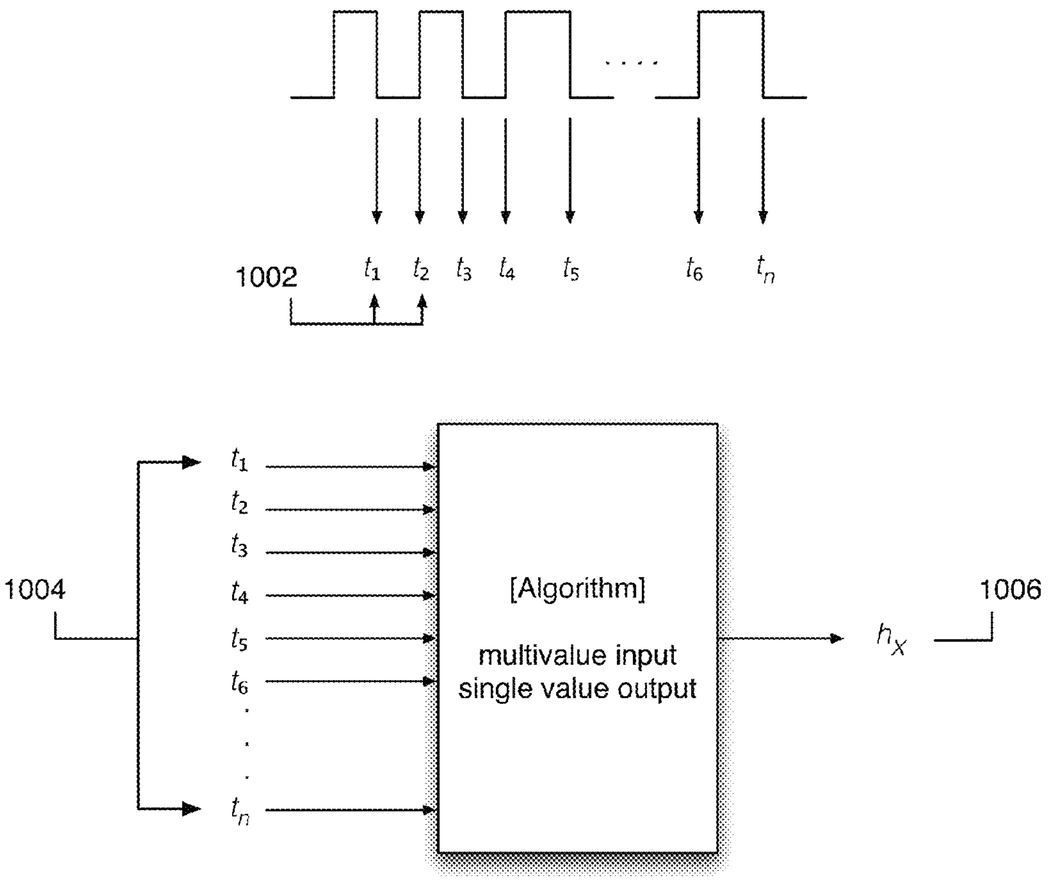
FIG. 10 depicts a waveform representing an infrared signal, a set of inputs that are transformed into a single output through an algorithm, and a block diagram implementation of such an algorithm.

FIG. 10 is a sample infrared signal and algorithm diagram. The timer described above measures the time between edges 1002. The time from one edge to the next is measured by subtracting the time from one edge $t_1$ until the time the next edge is detected $t_2$ or restarting the timer when a new edge is detected saving the value before resetting it to zero. This process is repeated for all subsequent signal edges until the final edge with a time of $t_n$. The multiple timer values 1004 are then passed through an algorithm 1006 with a single value hash code output 1008 $h_x$.

FIG. 11 is the DJB2 hash code creating algorithm. Although other similar algorithms may be used to encode the set of timer values, the DJB2 is used in one implementation. Each timer value is passed into the algorithm through the "*str" variable. The algorithm uses a variable "hash" and sets its initial value to 5381. The hash variable is altered with a while loop through the formula shown in FIG. 10.

Figure 12:
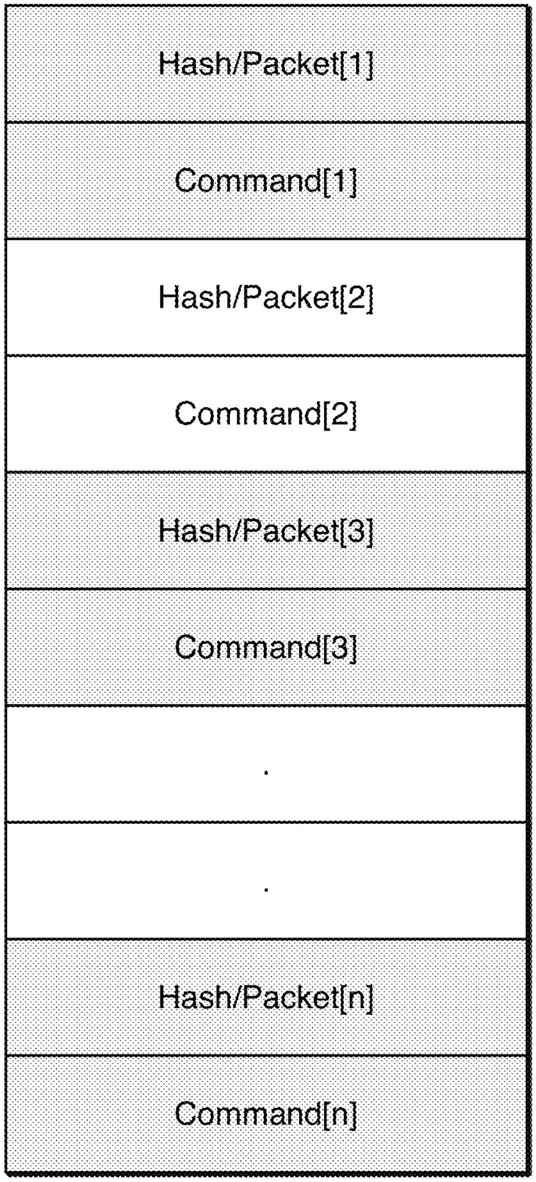
FIG. 12 depicts a sample memory table for storing a recorded signal and the associated command or set of commands.

FIG. 12 is a sample memory table where hash code or packet values are stored. The hash code/packet is stored with its associated command or combination of commands. This table stores hash codes/packets and their associated commands or combination of commands from Hash Code/Packet [1] and its associated Command [1] through Hash Code/Packet [n] and its associated Command [n]. Each command may be recalled from the table and used when the hash code/packet associated with it is located in the table as described above.

To conclude, various implementations of methods and devices for learning and playing back infrared and other external signals have been described. These methods and devices allow for any standard infrared remote control to be used to send standard computer commands to a computer. In other embodiments the methods and devices may be adapted for signals other than infrared and for devices other than a computer.

Specific embodiments of the invention have been shown in the drawings and described in detail herein to help elucidate the inventive concepts. It should be understood, however, that the invention is not to be limited to the particular forms disclosed; rather, the invention is to cover all modifications, equivalents, and alternatives falling within the scope of the following claims.

I claim:

1. A method for learning electromagnetic signals comprising:
- detecting an electromagnetic signal transmitted from an external device by measuring the pulse width of the electromagnetic signal;
- converting the detected electromagnetic signal into a numerical representation by assigning a multi-bit value to the pulse width;
- placing the numerical representation into an array;
- transforming the array with an algorithm;
- storing the resulting transformation into a memory table; and
- associating the resulting transformation with a computer command or combination of computer commands and adding the associated computer command or combination of commands into the memory table.

2. The method of claim 1 wherein the transformation of the array comprises: encoding the numerical representations in the array using an algorithm with multiple inputs producing a single output.

3. The method of claim 1 wherein the electromagnetic signal is an infrared signal.

4. The method of claim 3 wherein the infrared signal is detected by an infrared receiver.

5. The method of claim 4 wherein converting the detected electromagnetic signal into a numerical representation comprises:
- detecting an edge of an infrared signal;
- waiting for either a subsequent edge of the infrared signal or the expiration of a predetermined amount of time; and
- recording the time between the previous edge of the infrared signal and the subsequent edge of the infrared signal into an array of values.

6. The method of claim 1 wherein the electromagnetic signal is one chosen from a group consisting of: a WiFi signal, an electrical signal, and an optical signal.

7. A method for playing back a previously recorded electromagnetic signal comprising:
- detecting an electromagnetic signal transmitted from an external device by measuring the pulse width of the electromagnetic signal;
- converting the detected electromagnetic signal into a numerical representation by assigning a multi-bit value to the pulse width;
- placing the numerical representation into an array;
- transforming the array with an algorithm;
- searching a previously constructed memory table for a matching transformation of the array; and
- outputting an associated computer command or combination of commands if a matching transformation of the array is found in the memory table.

8. The method of claim 7 wherein the transformation of the array comprises: encoding the numerical representations in the array using an algorithm with multiple inputs producing a single output.

9. The method of claim 7 wherein the electromagnetic signal is an infrared signal.

10. The method of claim 9 wherein the infrared signal is detected by an infrared receiver.

11. The method of claim 7 wherein the electromagnetic signal is one chosen from a group consisting of: a WiFi signal, an electrical signal, and an optical signal.

12. The method of claim 7 wherein the previously constructed memory table is stored in memory in a computer or peripheral device.

13. A device for learning electromagnetic signals comprising:
- a microcontroller component comprising an arithmetic logic unit and a memory component;
- an electromagnetic signal detecting component coupled to the microcontroller component wherein the microcontroller component and electromagnetic signal detecting component are associate detected electromagnetic signals dynamically with commands or groups of commands wherein both the detected electromagnetic signal and the commands or groups of commands are uniquely written into the memory component of the microcontroller component; and
- a port coupled to the microcontroller component for communicating with a computer.

14. The device of claim 13 wherein the microcontroller further comprises: a native Universal Serial Bus stack that does not include an RS232 to Universal Serial Bus converter.

15. The device of claim 13 wherein the port is a Universal Serial Bus port.

16. The device of claim 13 wherein the port is either a serial port or an RS232 port.

17. The device of claim 13 wherein the port is coupled directly to a memory module.

18. The device of claim 13 wherein the electromagnetic signal is an infrared signal.

19. The device of claim 13 wherein the electromagnetic signal is one chosen from a group consisting of: a WiFi signal, an electrical signal, and an optical signal.

* * * * *